(12) United States Patent
Reyment (10) Patent No.: US 10,085,432 B2
(45) Date of Patent: *Oct. 2, 2018

(54) VARIABLE DEPTH FISHING LURE (71) Applicant: Sonneclaire Lures, LLC, Skokie, IL (US)

(72) Inventor: Andrew J. Reyment, Green Bay, WI (US)

(73) Assignee: SONNECLAIRE LURES, LLC, Skokie, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,900

(22) Filed: Feb. 20, 2017

(65) Prior Publication Data

US 2017/0156299 A1    Jun. 8, 2017

Related U.S. Application Data (63) Continuation-in-part of application No. 14/620,228, filed on Feb. 12, 2015, now Pat. No. 9,572,331.

(51) Int. Cl.
*A01K 85/18* (2006.01)
*A01K 91/04* (2006.01)
*A01K 85/16* (2006.01)

(52) U.S. Cl.
CPC .............. *A01K 85/18* (2013.01); *A01K 85/16* (2013.01); *A01K 91/04* (2013.01)

(58) Field of Classification Search
CPC ......... A01K 85/00; A01K 85/16; A01K 85/18
See application file for complete search history.

(56) References Cited

U.S. PATENT DOCUMENTS

| | | | | | |
|---|---|---|---|---|---|
| 2,455,155 | A | * | 11/1948 | Baima | A01K 85/16 43/42.02 |
| 2,494,384 | A | * | 1/1950 | Gadzinski | A01K 85/16 43/42.09 |
| 2,776,517 | A | * | 1/1957 | Borgström | A01K 85/16 43/42.22 |
| 2,945,318 | A | * | 7/1960 | Lassiter | A01K 85/16 43/42.09 |
| 3,902,267 | A | * | 9/1975 | Monchil | A01K 85/16 43/42.23 |
| 3,950,882 | A | * | 4/1976 | Monchil | A01K 85/16 43/42.23 |
| 4,215,507 | A | * | 8/1980 | Russell | A01K 85/16 43/42.22 |
| 4,869,014 | A | * | 9/1989 | Francklyn | A01K 83/06 43/42.47 |
| 4,944,112 | A | * | 7/1990 | Garmany | A01K 85/16 43/42.09 |

(Continued)

*Primary Examiner* — Michael H Wang
(74) *Attorney, Agent, or Firm* — Donald J. Ersler (57) ABSTRACT A variable depth fishing lure preferably includes a hollow body, an adjustable bill, a spring pin device and at least one treble hook. The hollow body includes a first body half and a second body half. The adjustable bill includes an indexing portion and a bill portion. Indexing slots are formed in a front and inside surface of the first and second body halves to receive the indexing portion. The spring pin device preferably includes a first eyelet pin, a second eyelet pin, a compression spring and two bored contact balls. One end of the spring pin device is engaged with the adjustable bill and an opposing end thereof is engaged with at least one of the first and second body halves. A position of the adjustable bill is changed by pulling thereof away from the hollow body; tilting it either up or down and then releasing.

20 Claims, 8 Drawing Sheets

(56) References Cited

U.S. PATENT DOCUMENTS

| | | | | |
|---|---|---|---|---|
| 5,182,875 | A | * | 2/1993 | Righetti .................. A01K 85/18 43/42.09 |
| 5,329,721 | A | * | 7/1994 | Smith .................... A01K 85/16 43/42.22 |
| 5,337,508 | A | * | 8/1994 | Pfeiffer .................. A01K 85/16 43/42.03 |
| 5,566,496 | A | * | 10/1996 | Rutherford ............ A01K 85/16 43/42.09 |
| D396,261 | S | * | 7/1998 | Duncan ........................ D22/126 |
| 6,041,539 | A | * | 3/2000 | Huang .................... A01K 85/16 43/42.22 |
| 6,058,643 | A | * | 5/2000 | Marusak ................ A01K 85/00 43/42.09 |
| 6,101,758 | A | * | 8/2000 | Finley .................... A01K 85/16 43/42.22 |
| 8,028,464 | B2 | * | 10/2011 | Smith .................... A01K 85/00 43/42.09 |
| 8,720,104 | B2 | * | 5/2014 | Smith .................... A01K 85/00 43/42.22 |
| 2004/0006909 | A1 | * | 1/2004 | Essad .................... A01K 85/16 43/42.22 |
| 2009/0300964 | A1 | * | 12/2009 | Nemethy ............... A01K 85/16 43/4.5 |
| 2012/0144723 | A1 | * | 6/2012 | Davidson ............... A01K 85/01 43/17.6 |
| 2015/0342166 | A1 | * | 12/2015 | McWilliams .......... A01K 85/16 43/42.04 |
| 2016/0007581 | A1 | * | 1/2016 | Davidson ............... A01K 85/02 43/17.1 |
| 2017/0280693 | A1 | * | 10/2017 | Lehl ....................... A01K 97/00 |

\* cited by examiner

VARIABLE DEPTH FISHING LURE

CROSS-REFERENCES TO RELATED APPLICATIONS

This is a continuation-in-part patent claiming the benefit of application Ser. No. 14/620,228, filed on Feb. 12, 2015.

BACKGROUND OF THE INVENTION

Field of the Invention

The present invention relates generally to fishing and more specifically to a variable depth fishing lure, which may be configured by changing a position of an adjustable bill.

Discussion of the Prior Art

It appears that the prior art does not teach or suggest a crank bait, which includes an adjustable bill and multiple line holes in a top and front of the lure for changing a fulcrum point thereof.

Accordingly, there is a clearly felt need in the art for a variable depth fishing lure, which includes a two position adjustable lip and multiple line eyelets.

SUMMARY OF THE INVENTION

The present invention provides a variable depth fishing lure, which may be configured by changing the position of an adjustable bill. The variable depth fishing lure preferably includes a hollow body, an adjustable bill, a spring pin, a spring retainer and at least one treble hook. The hollow body preferably includes a first body half and a second body half. At least two horizontal bill slots are formed on a front of the hollow body. The adjustable bill includes a duck bill shape. A curved body boss is formed on one end of the adjustable bill. A horizontal projection extends from an inside surface of the curved body boss. The horizontal projection is sized to be received by one of the at least two horizontal bill slots. One end of the spring pin is pivotally retained at the one end of the adjustable bill. The spring retainer is pivotally retained in the hollow body. A spring pin hole is formed through the spring retainer to receive the spring pin. An opposing end of the spring pin is inserted into a compression spring. The opposing end of the spring pin is terminated with a nut or the like to retain the compression spring. To change a position of the adjustable bill, an opposing end of the adjustable bill is pulled away from the hollow body and moved vertically for insertion into an adjacent horizontal slot. The compression spring biases the adjustable bill against the front of the hollow body.

A hooking device preferably includes a multi-position line eyelet, a hook line and at least one hook. The multi-position line eyelet includes a plurality of holes for the attachment of a fishing line or a leader line. One end of the hook line extends from the multi-position eyelet and at least one hook extends from an opposing end of the hook line. The multi-position line eyelet is retained between the first and second body halves at substantially a top thereof. The hook line is retained in a line groove formed in at least one of the first and second body halves. The multi-position line eyelet could be replaced with a single line eyelet.

A second embodiment of a variable depth fishing lure preferably includes a hollow body, an adjustable bill, a spring pin device, a hook retainer and at least one treble hook. The hollow body preferably includes a first body half and a second body half. The outer surface of the first and second halves resemble the shape and appearance of a small fish. The adjustable bill includes an indexing portion and a bill portion. The bill portion extends from the indexing portion. The bill portion is perpendicular to the indexing portion. A first indexing slot is formed in a front and inside surface of the first body half and a second indexing slot is formed in a front and inside surface of the second body half to receive the indexing portion of the adjustable bill. A first spring pin slot is formed behind the first indexing slot and a second spring pin slot is formed behind the second indexing slot. A first spring pin cavity is formed behind the first spring pin slot and a second spring pin cavity is formed behind the second spring pin slot.

The spring pin device preferably includes a first eyelet pin, a second eyelet pin, a compression spring and two bored contact balls. A pin hole is formed in a front of the indexing portion. The first eyelet pin includes a first eyelet end and an opposing end includes a first bent end. The first bent end is inserted into the pin hole in the indexing portion. The second eyelet pin includes a split eyelet end and an opposing end of the second eyelet pin is inserted through a first bored contact ball; the compression spring and the second bored contact ball. The opposing end of the second eyelet pin is bent to retain the compression spring and the two bored contact balls. The split eyelet is inserted into the first eyelet, such that the first eyelet is engaged with the split eyelet. The first and second spring pin slots provide clearance for axial movement of the first eyelet pin. The first bored ball is retained at an entrance to the first and second spring pin slots. The first and second spring pin cavities provide clearance for the two bored balls, the compression spring and the second eyelet pin. A spring pin clearance slot is formed in an end of the indexing portion to provide clearance for the first and second eyelet pins. To change a position of the adjustable bill, the bill portion is pulled away from the hollow body; tilted either up or down and then released into the first and second indexing slots. The compression spring biases the adjustable bill against the front of the hollow body.

The hook retainer preferably includes a first U-shaped end, an elongated portion and a second U-shaped end. The first U-shaped end extends from a first end of elongated portion and the second U-shaped portion extend from a second end of the elongated portion. A first hook retainer slot is formed in an inside surface of the first body half and a second hook retainer slot is formed in an inside surface of the second body half to receive the hook retainer. A first treble hook is secured to the first U-shaped end with a first split or spiral ring and a second treble hook is secured to the second U-shaped end with a second split or spiral ring. A fishing line or a leader line is attached to the first bent end of the first eyelet pin.

Accordingly, it is an object of the present invention to provide a variable depth fishing lure, which includes an adjustable bill and a multi-position line eyelet.

These and additional objects, advantages, features and benefits of the present invention will become apparent from the following specification.

DETAILED DESCRIPTION OF THE PREFERRED EMBODIMENTS

Figure 1:
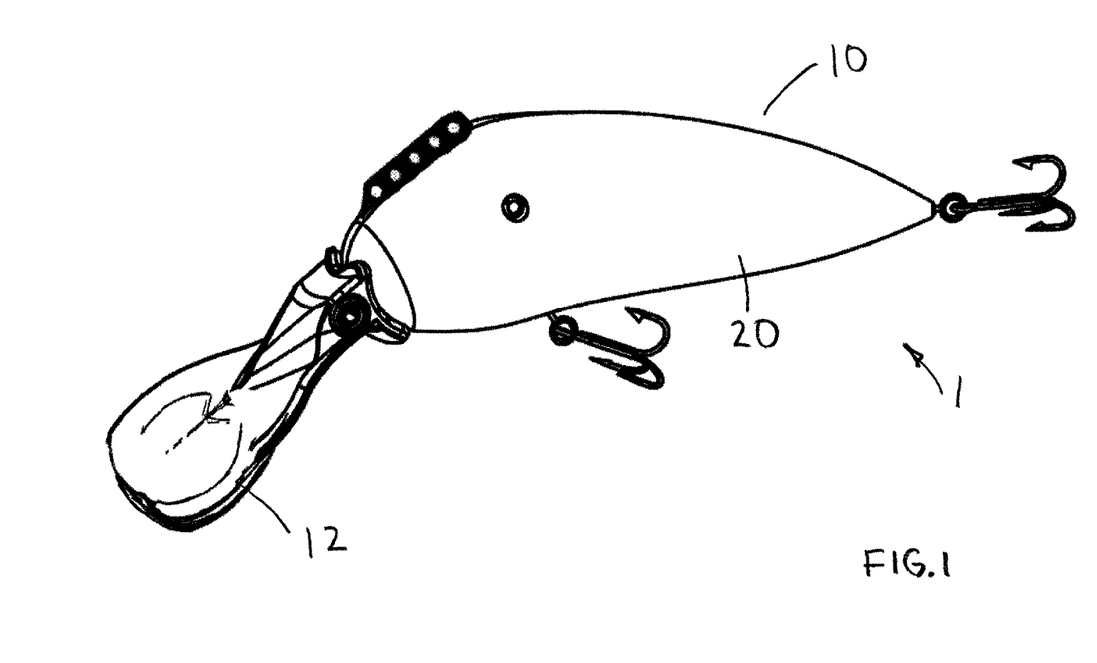
FIG. 1 is a perspective view of a variable depth fishing lure in accordance with the present invention.

With reference now to the drawings, and particularly to FIG. 1, there is shown a perspective view of a variable depth fishing lure 1. With reference to FIGS. 2-5, the variable depth fishing lure 1 preferably includes a hollow body 10, an adjustable bill 12, a spring pin 14, a spring retainer 16 and at least one treble hook. The hollow body 10 preferably includes a first body half 18 and a second body half 20. The adjustable bill 12, the spring retainer 16, and the first and second body halves 18, 20 are preferably fabricated by a plastic molding process. At least two horizontal bill slots 22 are formed in a front of the first and second body halves 18, 20. The adjustable bill 12 includes a duck bill shape and a curved body boss 24. The curved body boss 24 is formed on one end of the adjustable bill 12. A horizontal projection 26 extends from an inside surface of the curved body boss 24. The horizontal projection 26 is sized to be received by one of the at least two horizontal bill slots 22.

A pin boss 28 is formed on one end of the spring pin 14. A pin hole 30 is formed through the pin boss 28. A thread 32 is preferably formed on an opposing end of the spring pin 14 to threadably receive a nut 34. A bill pin hole 36 is formed through the one end of the adjustable bill 12. A bill pin 38 is inserted into the bill pin hole 36 and through the pin hole 30 to pivotally connect the adjustable bill 12 to the spring pin 14. The bill pin 38 is perpendicular to the spring pin 14. The spring retainer 16 includes a pivot base 40 and a spring flange 42. The spring flange 42 extends downward from the pivot base 40. A retainer pivot hole 41 is formed through the pivot base 40 and a spring pin hole 43 is formed through the spring flange 42. A pivot boss 44 is formed inside the first and second body halves 18, 20. A body pivot hole 45 is formed in the pivot boss 44 to receive a retainer pin 46. The spring retainer 16 is pivotally retained relative to the hollow body 10 by inserting the retainer pin 46 into the first and second body halves 18, 20 and through the spring retainer 16.

Figure 2:
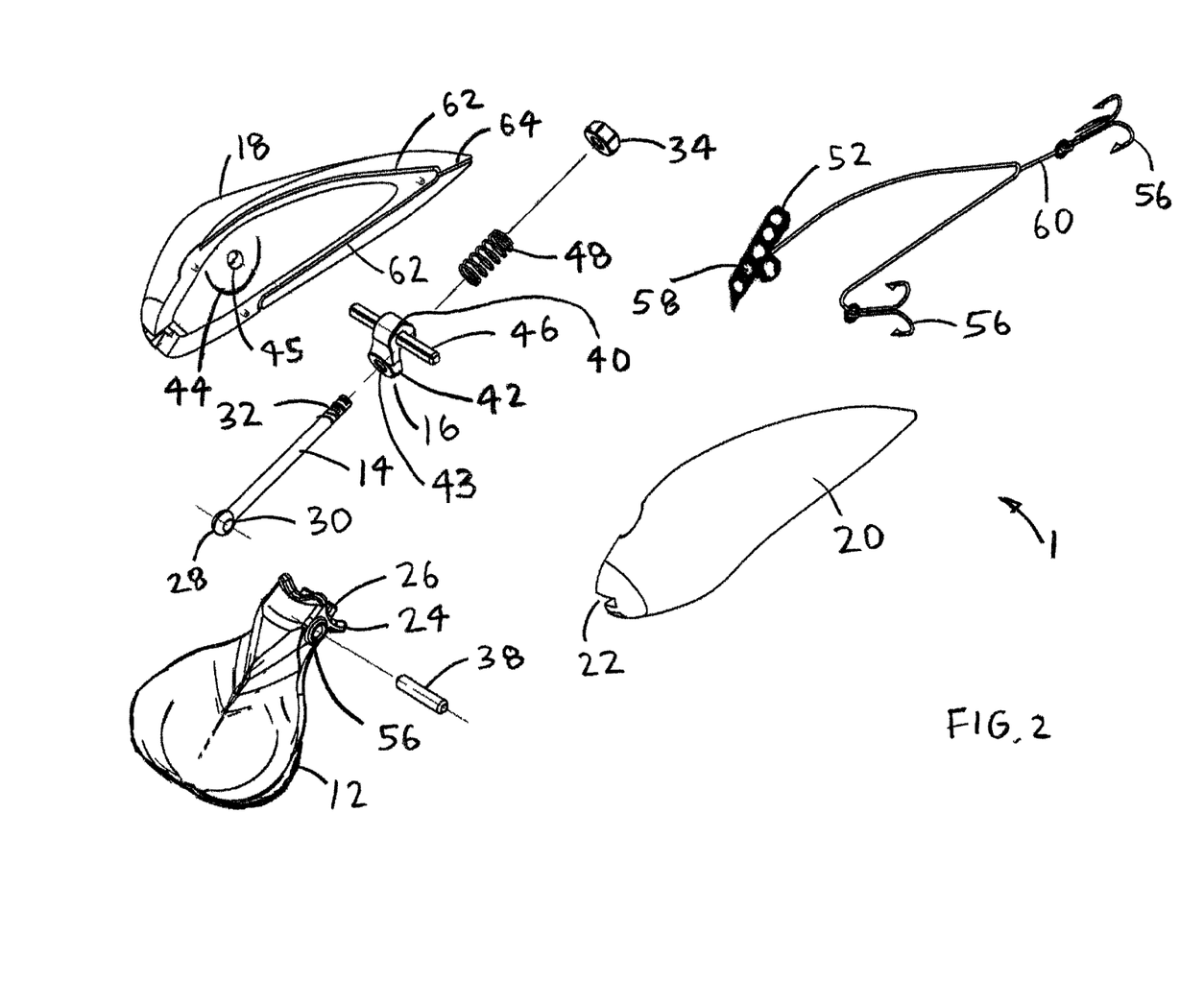
FIG. 2 is an exploded perspective view of a variable depth fishing lure in accordance with the present invention.
Figure 3:
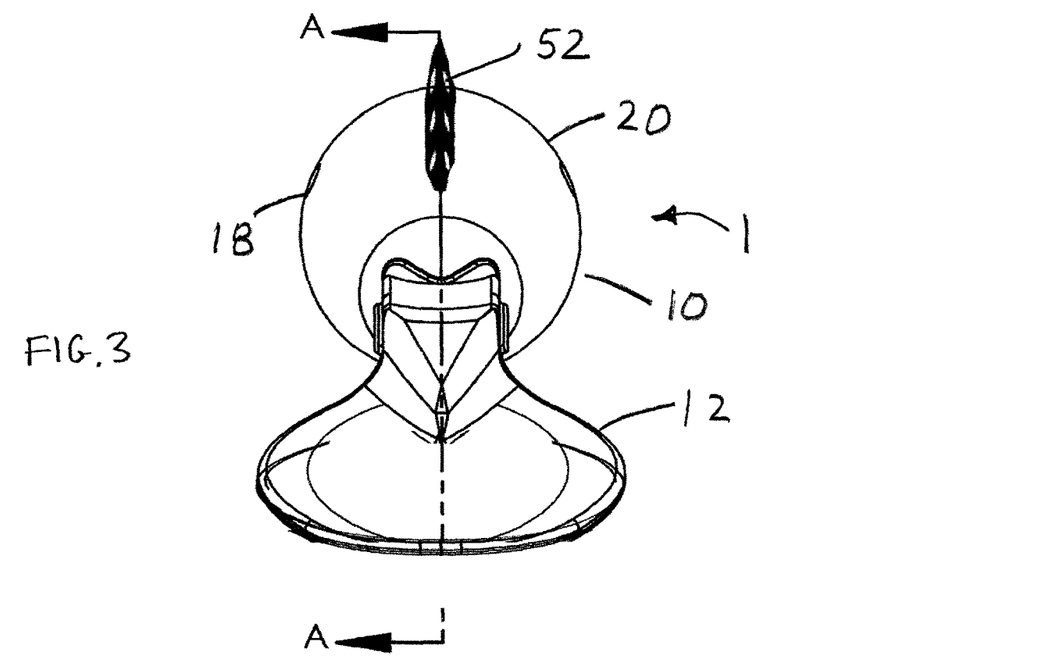
FIG. 3 is a front view of a variable depth fishing lure in accordance with the present invention.
Figure 4:
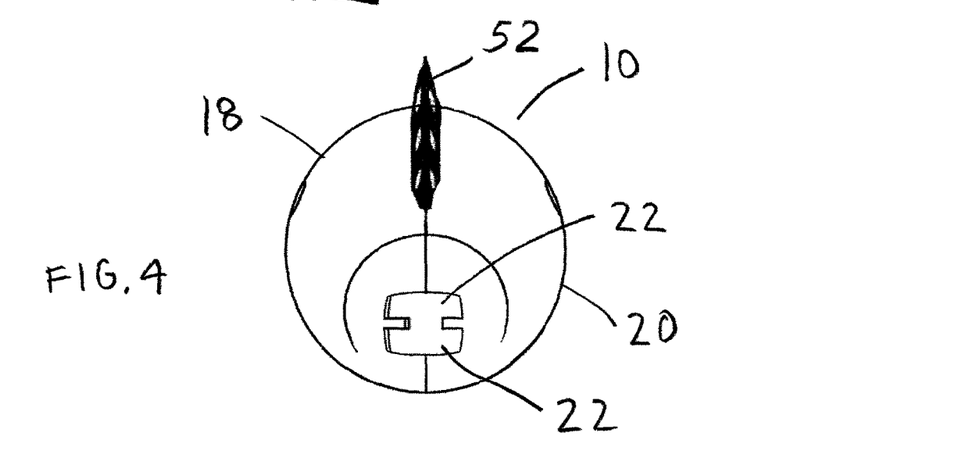
FIG. 4 is a front view of a variable depth fishing lure without an adjustable bill attached thereto in accordance with the present invention.
Figure 5:
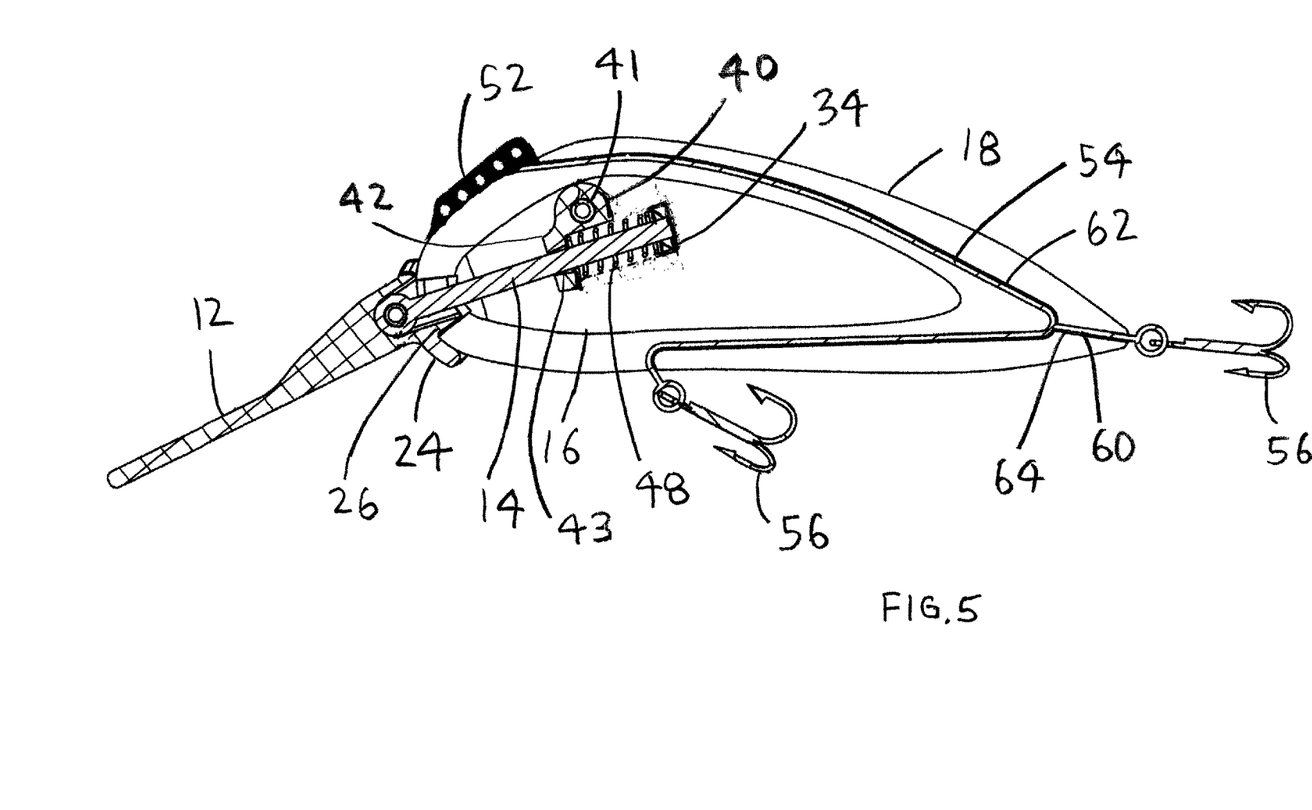
FIG. 5 is a cross sectional view of a variable depth fishing lure cut through FIG. 3 in accordance with the present invention.
Figure 6:
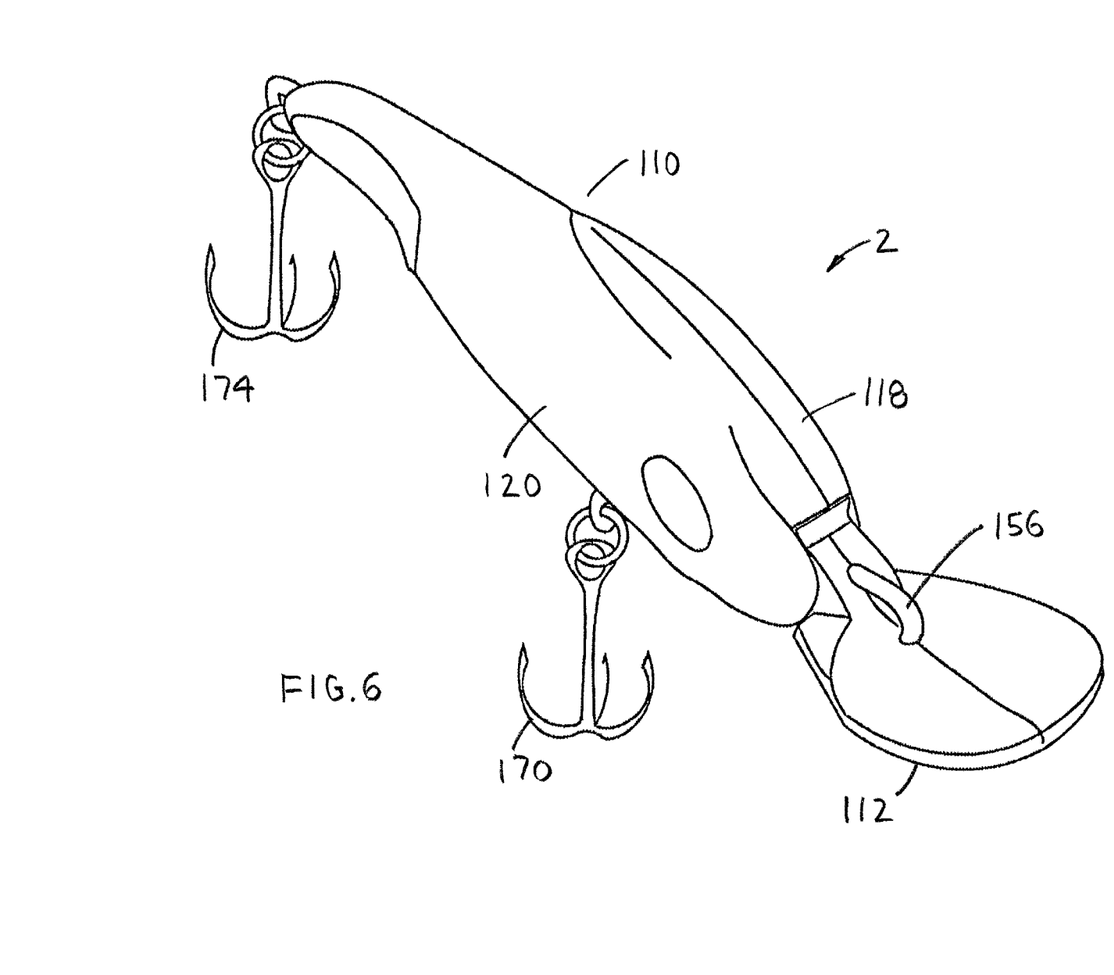
FIG. 6 is a perspective view of a second embodiment of a variable depth fishing lure in accordance with the present invention.

An opposing end of the spring pin 14 is inserted through the compression spring 48. The nut 34 is threaded on to the thread 32 of the spring pin 14 to retain the compression spring 48. The spring pin 14 is perpendicular to the retainer pin 46. However, other methods and devices may be used to replace the nut 34. To change a position of the adjustable bill 12 relative to the hollow body 10, an opposing end of the adjustable bill 12 is pulled away from the hollow body 10 and moved vertically for insertion into an adjacent horizontal slot 22.

A hooking device 50 preferably includes a multi-position line eyelet 52, a hook line 54 and at least one treble hook 56. The multi-position eyelet 52 includes a plurality of holes 58 for the attachment of a fishing line or a leader line. One end of the hook line 54 extends from the multi-position eyelet 52 and the treble hook 56 extends from an opposing end of the hook line 54. A second treble hook 56 preferably extends from a hook line extension 60, which extends from substantially a middle of the hook line 54. The multi-position line eyelet 52 is retained between the first and second body halves 18, 20 at substantially a top thereof. The hook line 54 is preferably retained in a line groove 62 formed in at least one of the first and second body halves 18, 20. The hook line extension 60 is retained in a line groove 64 formed in at least one of the first and second body halves 18, 20. The multi-position line eyelet 52 could be replaced with a single line eyelet. A waterproof sealant is placed between the first and second body halves 18, 20.

With reference to FIGS. 6-10, a second embodiment of a variable depth fishing lure 2 preferably includes a hollow body 110, an adjustable bill 112, a spring pin device 114, a hook retainer 116 and at least one treble hook. The hollow body 110 preferably includes a first body half 118 and a second body half 120. The outer surface of the first and second body halves 118, 120 resemble the shape of a small fish. The first and second body halves 118, 120 are preferably mirror images of each other. The adjustable bill 112 includes an indexing portion 122 and a bill portion 124. The bill 124 portion extends from the indexing portion 122. Opposing substantially planar surfaces of the bill portion 124 are perpendicular to planar surfaces of the indexing portion 122. The indexing portion 122 includes a plurality of flats 125 positioned at different angles relative to each other. A first indexing slot 126 is formed in a front and inside surface of the first body half 118 and a second indexing slot 128 is formed in a front and inside surface of the second body half 120 to receive the indexing portion 122 of the adjustable bill 112. A first spring pin slot 130 is formed behind the first indexing slot 126 and a second spring pin slot 132 is formed behind the second indexing slot 128. A first spring pin cavity 134 is formed behind the first spring pin slot 130 and a second spring pin cavity 136 is formed behind the second spring pin slot 132. The first and second indexing slots 126, 128 include a plurality of flats positioned at different angles relative to each other to receive the indexing portion 122.

Figure 7:
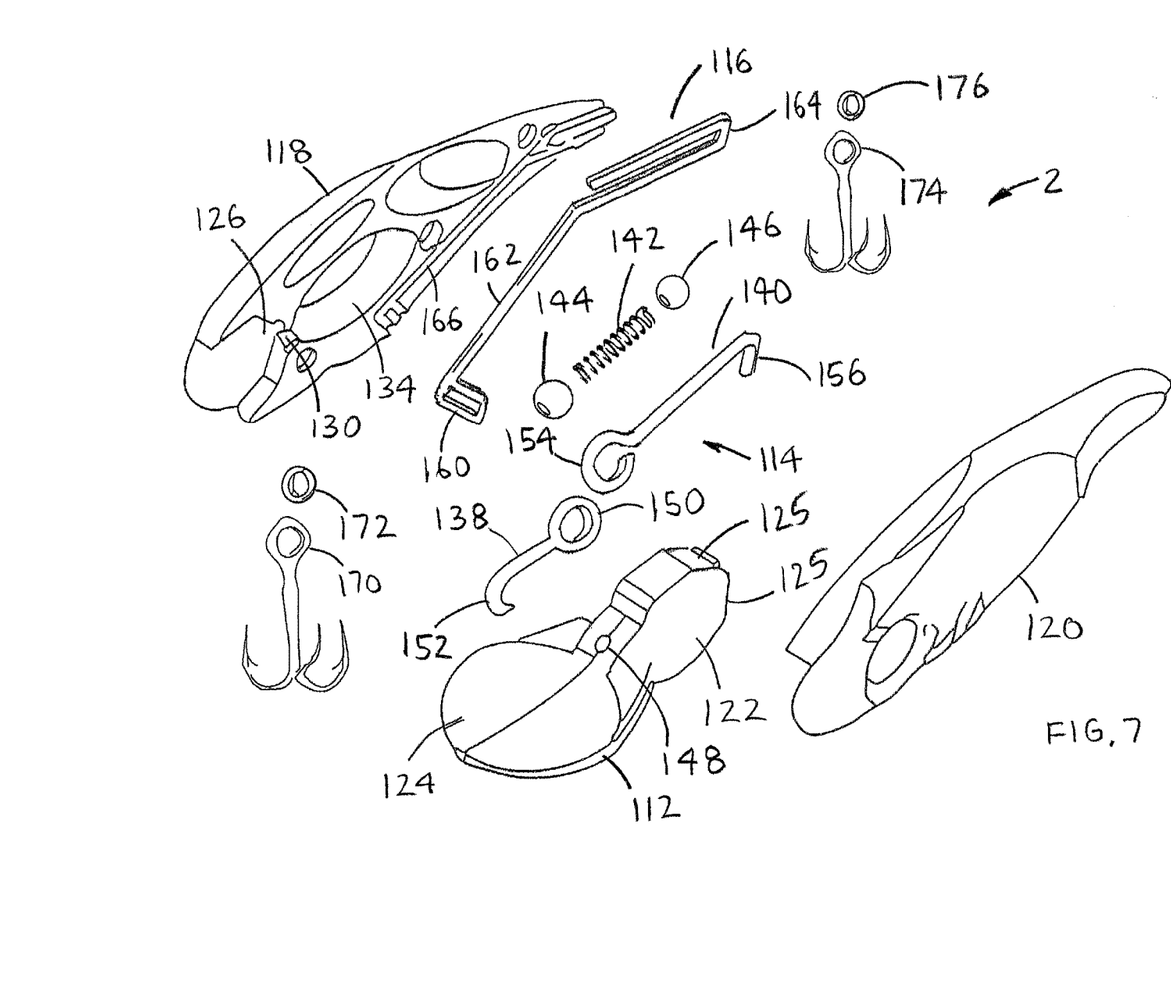
FIG. 7 is an exploded perspective view of a second embodiment of a variable depth fishing lure in accordance with the present invention.
Figure 10:
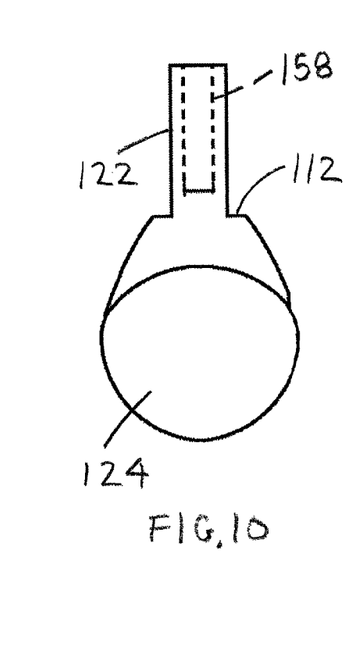
FIG. 10 is a top view of an adjustable bill of a second embodiment of a variable depth fishing lure in accordance with the present invention.
Figure 11:
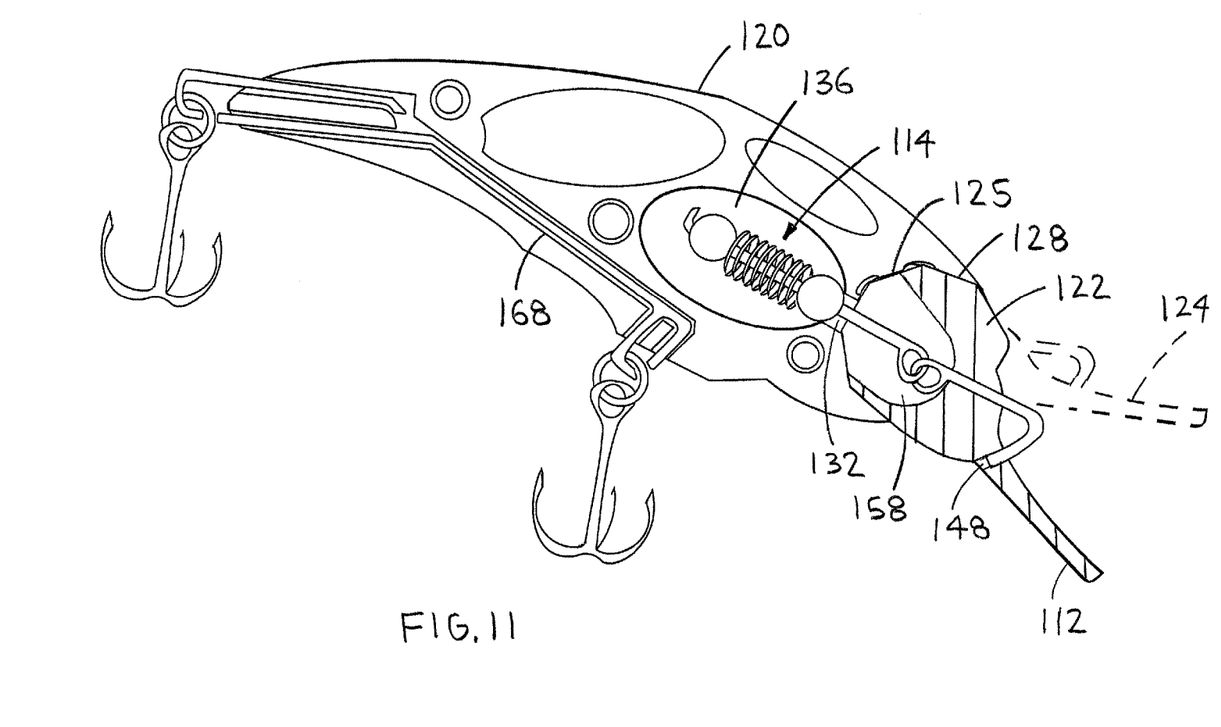
FIG. 11 is a cross sectional view of a second embodiment of a variable depth fishing lure cut through FIG. 3 in accordance with the present invention.

The spring pin device 114 preferably includes a first eyelet pin 138, a second eyelet pin 140, a compression spring 142 and two bored contact balls, 144, 146. A pin hole 148 is formed in a front of the indexing portion 122. The first eyelet pin 138 includes a first eyelet end 150 and an opposing end includes a first bent end 152. The first bent end 152 is inserted into the pin hole 148 in the indexing portion 122. The first bent end 152 acts as a fishing line eyelet when retained in the pin hole 148. The second eyelet pin 140 includes a split eyelet end 154 and an opposing end of the second eyelet pin 140 is inserted through the first bored contact ball 144; the compression spring 142 and the second bored contact ball 146. The opposing end of the second eyelet pin 140 is bent to form a bent end 156 to retain the compression spring 142 and the two bored contact balls 144, 146. The split eyelet 154 is inserted into the first eyelet 150, such that the first eyelet 150 is engaged with the split eyelet 154. The first and second spring pin slots 130, 132 provide clearance for axial movement of the first eyelet pin 138. The first bored ball 144 is retained at an entrance to the first and second spring pin slots 130, 132. The first and second spring pin cavities 134, 136 provide clearance for the two bored balls 144, 146, the compression spring 142 and the second eyelet pin 140. A spring pin clearance slot 158 is formed in an end of the indexing portion 122 to provide clearance for the first and second eyelet pins 138, 140. To change a position of the adjustable bill 112, the bill portion 124 is pulled away from the hollow body 110; tilted either up or down and then released into the first and second indexing slots 126, 128. The compression spring 142 biases the adjustable bill 112 against the front of the hollow body 110.

Figure 8:
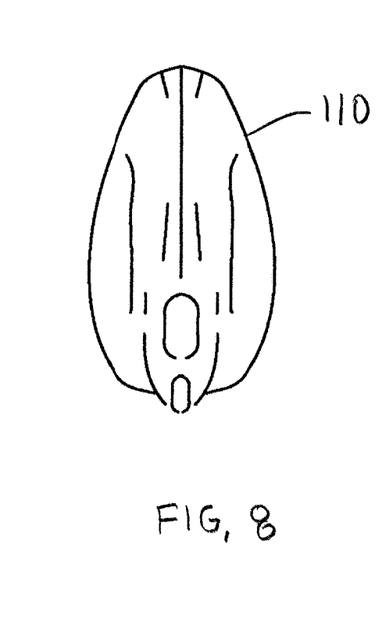
FIG. 8 is a rear view of a second embodiment of a variable depth fishing lure without treble hooks extending there from in accordance with the present invention.
Figure 9:
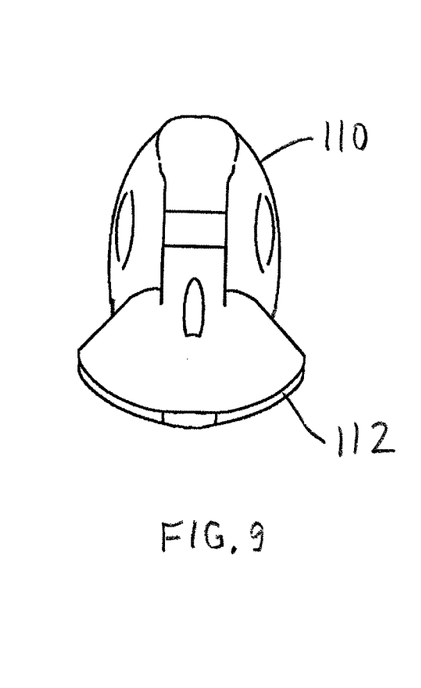
FIG. 9 is a front view of a second embodiment of a variable depth fishing lure without treble hooks extending there from in accordance with the present invention.

The hook retainer 116 preferably includes a first U-shaped end 160, an elongated portion 162 and a second U-shaped end 164. The first U-shaped end 160 extends from a first end of elongated portion 162 and the second U-shaped portion 164 extends from a second end of the elongated portion 162. A first hook retainer slot 166 is formed in an inside surface of the first body half 118 and a second hook retainer slot 168 is formed in an inside surface of the second body half 120 to receive the hook retainer 116. A first treble hook 170 is secured to the first U-shaped end 160 with a first split or spiral ring 172 and a second treble hook 174 is secured to the second U-shaped end 164 with a second split or spiral ring 176. A fishing line or a leader line is attached to the first bent end 152 of the first eyelet pin 138.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A variable depth fishing lure comprising:
a hollow body includes a first body half and a second body half, an indexing slot is formed in a front of at least one of said first and second body halves;
an adjustable bill includes an indexing portion and a bill portion extending from said indexing portion, said indexing portion is sized to be received by said indexing slot;
a spring pin device is engaged with said adjustable bill on one end, said spring pin device is engaged with at least one of said first and second body halves on an opposing end thereof, wherein said spring pin device biases said adjustable bill against said hollow body; and
at least one hook retaining device capable of retaining at least one treble hook, said at least one hook retaining device is retained by at least one of said first and second body halves.

2. The variable depth fishing lure of claim 1 wherein:
said spring pin device includes a first eyelet pin, a second eyelet pin and a compression spring, one end of said first eyelet pin is engaged with said adjustable bill, an opposing end of said first eyelet is engaged with one end of said second eyelet, said compression spring is retained on said second eyelet pin, an opposing end of said second eyelet pin is bent to retain said compression spring.

3. The variable depth fishing lure of claim 2 wherein:
said indexing portion includes a cavity to provide clearance for a junction of said first eyelet pin and a second eyelet pin.

4. The variable depth fishing lure of claim 2 wherein:
said hollow body has the shape and appearance of a fish.

5. The variable depth fishing lure of claim 1 wherein:
said at least one hook retaining device includes a first U-shaped end, an elongated portion and a second U-shaped end, said first U-shaped end extends from a first end of said elongated portion and said second U-shaped portion extends from a second end of said elongated portion.

6. The variable depth fishing lure of claim 5, further comprising:
a first split or spiral ring capable of joining a first treble hook and said first U-shaped end, a second split or spiral ring capable of joining a second treble hook and said second U-shaped end.

7. The variable depth fishing lure of claim 1 wherein:
said indexing portion includes a plurality of flats positioned at different angles relative to each other, said indexing slot includes a plurality of flats positioned at different angles relative to each other to receive said indexing portion.

8. A variable depth fishing lure comprising:
a hollow body includes a first body half and a second body half, an indexing slot is formed in a front of at least one of said first and second body halves;
an adjustable bill includes a indexing portion and a bill portion extending from said indexing portion, said indexing portion is sized to be received by said indexing slot;
a spring pin device includes an fishing line eyelet, said spring pin device is engaged with said adjustable bill on one end, said spring pin device is engaged with at least one of said first and second body halves on an opposing end thereof, wherein said spring pin device biases said adjustable bill against said hollow body; and
at least one hook retaining device capable of retaining at least one treble hook, said at least one hook retaining device is retained by at least one of said first and second body halves.

9. The variable depth fishing lure of claim 8 wherein:
said spring pin device includes a first eyelet pin, a second eyelet pin and a compression spring, one end of said first eyelet pin is engaged with said adjustable bill, an opposing end of said first eyelet is engaged with one end of said second eyelet, said compression spring is retained on said second eyelet pin, an opposing end of said second eyelet pin is bent to retain said compression spring.

10. The variable depth fishing lure of claim 9 wherein:
said indexing portion includes a cavity to provide clearance for a junction of said first eyelet pin and a second eyelet pin.

11. The variable depth fishing lure of claim 8 wherein:
said at least one hook retaining device includes a first U-shaped end, an elongated portion and a second U-shaped end, said first U-shaped end extends from a first end of said elongated portion and said second U-shaped portion extends from a second end of said elongated portion.

12. The variable depth fishing lure of claim 11, further comprising:

a first split or spiral ring capable of joining a first treble hook and said first U-shaped end, a second split or spiral ring capable of joining a second treble hook and said second U-shaped end.

13. The variable depth fishing lure of claim 8 wherein:
said indexing portion includes a plurality of flats positioned at different angles relative to each other, said indexing slot includes a plurality of flats positioned at different angles relative to each other to receive said indexing portion.

14. The variable depth fishing lure of claim 8 wherein:
said hollow body has the shape and appearance of a fish.

15. A variable depth fishing lure comprising:
a hollow body includes a first body half and a second body half, an indexing slot is formed in a front of at least one of said first and second body halves;
an adjustable bill includes a indexing portion and a bill portion extending from said indexing portion, said indexing portion is sized to be received by said indexing slot, wherein said adjustable bill may be positioned in said indexing slot in at least two different angular orientations relative to said hollow body;
a spring pin device is engaged with said adjustable bill on one end, said spring pin device is engaged with at least one of said first and second body halves on an opposing end thereof, wherein said spring pin device biases said adjustable bill against said hollow body; and
at least one hook retaining device capable of retaining at least one treble hook, said at least one hook retaining device is retained by at least one of said first and second body halves.

16. The variable depth fishing lure of claim 15 wherein:
said spring pin device includes a first eyelet pin, a second eyelet pin and a compression spring, one end of said first eyelet pin is engaged with said adjustable bill, an opposing end of said first eyelet is engaged with one end of said second eyelet, said compression spring is retained on said second eyelet pin, an opposing end of said second eyelet pin is bent to retain said compression spring.

17. The variable depth fishing lure of claim 16 wherein:
said indexing portion includes a cavity to provide clearance for a junction of said first eyelet pin and a second eyelet pin.

18. The variable depth fishing lure of claim 15 wherein:
said at least one hook retaining device includes a first U-shaped end, an elongated portion and a second U-shaped end, said first U-shaped end extends from a first end of said elongated portion and said second U-shaped portion extends from a second end of said elongated portion.

19. The variable depth fishing lure of claim 18, further comprising:
a first split or spiral ring capable of joining a first treble hook and said first U-shaped end, a second split or spiral ring capable of joining a second treble hook and said second U-shaped end.

20. The variable depth fishing lure of claim 15 wherein:
said indexing portion includes a plurality of flats positioned at different angles relative to each other, said indexing slot includes a plurality of flats positioned at different angles relative to each other to receive said indexing portion.

* * * * *